United States Patent Office 3,373,012
Patented Mar. 12, 1968

3,373,012
PRODUCTION OF METALLURGICAL PRODUCTS
John F. Hardy, Andover, and Merrill E. Jordan, Walpole, Mass., assignors to Cabot Corporation, Boston, Mass., a corporation of Delaware
No Drawing. Filed Nov. 12, 1964, Ser. No. 410,712
19 Claims. (Cl. 75—.5)

This invention relates to a process for producing metallurgical powders of sub-micron dimensions. More precisely, the invention disclosed herein relates to an improved process for producing finely-divided powders comprising a free metal(s), carbides, metal/metal oxide mixtures or metal/metal carbide mixtures Finely-divided metallurgical powders are well known products of commerce. Such products presently have many known specialized applications and their potential applications are regarded as especially promising. Many processes are known for producing metallurgical powders and in general, the fineness of the ultimate powder is primarily determined by the process utilized. For example, the most finely-divided powders such as those having average particle diameters below about one micron are generally produced by elaborate fuming processes or by processes wherein the state of subdivision of the powder is achieved by highly specialized attrition techniques. Accordingly, the most finely-divided powders are rather expensive because of the intricate processes involved in producing them. In view of the growing interest in metallurgical powders, especially those having average particle diameters below about 0.1 micron, any process whereby such powders can be produced in a simple and inexpensive fashion would be a notable contribution to the art.

A principal object of the present invention is to provide an improved process for making the foregoing contribution to the art.

A more specific object of the present invention is to produce finely-divided metallurgical powders in an economical fashion.

Another object of the present invention is to provide a process for producing combinations of metallurgical powders in a finely-divided form and varying amounts of carbon which combinations have specialized properties and are of particular utility as fillers and/or as pigments in elastomeric and plastomeric compositions.

Another object of the present invention is to provide an improved process for producing mixtures of diverse metallurgical powders.

Other objects and advantages of the present invention will in part be obvious to those well skilled in the art and will in part appear hereinafter.

In a very broad sense, the above-mentioned objects and advantages are realized in accordance with the practice of our invention by precipitating a metal compound or a mixture of metal compounds in the presence of a finely-divided carbon black. Said procedure insures a uniform and intimate association of the metal compound(s) and carbon black where thereafter the resulting mixture is introduced into a high temperature environment to convert the metal compound(s) to the corresponding free metal or metal carbide in finely-divided powder form wherein the particles in most cases have average particle diameters below about 0.5 micron and often between about 0.02 and about 0.06 micron.

The manner of precipitating the metal compound about the carbon black is critical since this factor assures the fine particle size of the ultimate product. Thus, we have found that the intimate mixture resulting from the precipitation step allows the conversion of the metal compound to occur at reduced temperatures and/or at shorter reaction times. The advantages in the use of lower temperatures and/or shorter reaction times will be obvious to those skilled in the art. For example, lower temperatures and shorter residence times of reactants in a conversion zone obviously imply many economic advantages in both the design of apparatus and operation. Even more importantly, lower temperatures and shorter times minimize sintering which has long been a serious problem in converting metal compounds to fine particle size end products.

In addition to functioning as a reactant, the carbon black also contributes to the lower conversion temperatures and shorter reaction times realized in accordance with our invention. Also the carbon black permits one to conveniently apply the practice of our invention to the production of metallurgical powders containing selected amounts of carbon black.

For the purposes of the present specification, and the claims attached hereto, carbon black refers generally to products produced by the incomplete combustion and/or pyrolysis of hydrocarbon materials. Thus, for example, materials referred to in the art as acetylene blacks, lamp blacks, channel blacks, thermal blacks, etc., are all included within the scope of the present invention. It is well known that the particle size of carbon black is usually not greater than about 0.5 micron.

Broadly, the metal compounds included within the scope of the most preferred embodiment of the present invention are those metal compounds which can react with carbon to produce either the corresponding free metal or metal carbide. More precisely, the most preferred compounds include the water soluble compounds of copper, tungsten, zinc, lead, tin, iron, cobalt, nickel, manganese, vanadium, molybdenum, boron, thorium, aluminum, titanium, zirconium, tantalum, uranium, magnesium, niobium and mixtures of these. Representative compounds include the organic and inorganic salts and complex salts of the above-mentioned metals such as the sulfates, chlorides, nitrates, acetates, tartrates and carbonates thereof.

Precipitation of a metal compound(s) can be accomplished in many manners which are familiar to those well skilled in the art. For example, oftentimes precipitation can be conveniently accomplished by adding a soluble salt to a solution of a metal compound(s) having carbon black uniformly dispersed therein. Also the precipitation can be accomplished by simultaneously adding a solution of a soluble salt and a solution of a metal compound to a slurry or dispersion of carbon black. In such procedures, the precipitated metal compound which can be a hydroxide, oxide or hydrous oxide is normally uniformly coated on the carbon black. The solids are generally washed and dried and the dried solids treated under selected conditions of temperature and environment to convert the metal compound therein to the desired ultimate metallurgical product.

It is pointed out that many metal compounds cannot readily be reacted with carbon to yield the corresponding free metal. Such compounds can be present in said precipitates if desired. However, in that event, there must also be present a metal compound which can be converted by reaction with carbon to the corresponding free metal or metal carbide.

The exact amount of carbon black to be combined with any of the above-mentioned compounds will be determined primarily by the final metallurgical powder desired. As stated, the practice of our invention can be applied to the production of diverse metallurgical powders, including powdered metals, metal carbides, metal/metal oxide mixtures and metal/metal carbide mixtures. Accordingly, the minimum amount of carbon involved in the practice of our invention will be substantially equivalent to the stoichiometric amount required to produce the desired powder.

The amount of residual carbon black which can be tolerated in combination with the final metallurgical powder is another factor which can affect the amount of carbon black to be combined with the aforesaid compounds. We consider our process most valuable when applied to the production of finely-divided metallurgical powders of high purity, that is to say, metallurgical powders in combination with very small quantities of carbon black, i.e. comprising less than about 10% carbon black by weight of the total powder. Accordingly, in the most preferred embodiment of our invention, the amount of carbon black utilized initially will rarely exceed the amount required to produce powders comprising about 10% by weight carbon black.

However, it is to be understood that our process can also be applied to the production of finely-divided metallurgical powders in combination with larger amounts of carbon black. Such compositions can be utilized as fillers in elastomeric or plastomeric compositions and accordingly can contain up to about 90% by weight of carbon black if desired.

The temperatures at which the metal compound in the precipitate can be converted to the desired metallurgical product can vary over a wide range. In general, the range includes temperatures substantially below those normally required to convert the metal compound as well as temperatures that can exceed said normal decomposition temperatures by 400 or 500° F. or even more. Since our process is normally operated continuously, it is obviously desirable to reduce residence time to a minimum and thus the temperature of the conversion zone will normally be relatively high.

The environment in the conversion zone will also be determined primarily by the final metallurgical powder desired. Said environment can easily be selected by one skilled in the art. An inert atmosphere is often suitable for producing metal powders when the conversion temperature is closely controlled and maintained below or at about the normal decomposition temperature of the compound utilized. Normally, however, a reducing atmosphere is definitely preferred when the practice of our invention is applied to the direct production of powdered metal carbides, free metals, metal/metal oxide mixtures and metal/metal carbide mixtures.

The following specific examples should be considered as illustrative only and as in no sense limiting the scope of the present invention.

*Example 1*

This example illustrates a manner of producing a finely-divided powder comprising free nickel metal and carbon black.

A solution of nickel sulfate is prepared by dissolving 500 grams of nickel sulfate in 2 liters of water. Said solution of nickel sulfate and a sufficient quantity of an aqueous ammonium carbonate solution to raise and maintain the pH at about 7.5 are added simultaneously at approximately uniform rates with vigorous stirring to an aqueous dispersion containing 20% by weight furnace carbon black. The resulting solids are washed and the filter cake which comprises carbon black having nickel hydroxide deposited thereon is then dried in an oven at about 300° F. The solids are then heated at a temperature of about 1500° F. in a reducing atmosphere for about 30 minutes. The resulting powder of sub-micron dimensions comprises finely-divided free nickel metal and a minor amount of carbon.

*Example 2*

This example illustrates a manner of producing a finely-divided powder comprising titanium carbide and carbon black.

A solution of titanium sulfate is prepared by dissolving 400 grams thereof in 2 liters of water. The solution of titanium sulfate and sufficient ammonium hydroxide solution to raise and maintain the pH at about 7.5 are then added simultaneously at approximately uniform rates and with vigorous stirring to an aqueous dispersion containing 25% by weight furnace carbon black. The solids are washed and the filter cake which comprises carbon black having titanium hydroxide deposited thereon is then dried in an oven at about 300° F. The solids are then heated at a temperature of about 3000° F. in an inert atmosphere for about 60 minutes. The resulting powder of sub-micron dimensions comprises titanium carbide and a minor amount of carbon.

Other metal compounds which can react with carbon to form the corresponding metal carbide can be utilized in this example in place of titanium sulfate.

*Example 3*

This example illustrates a manner of producing a finely-divided free nickel metal/free copper metal powder.

A solution of nickel sulfate and copper nitrate is prepared by dissolving 200 grams of nickel sulfate and 200 grams of copper nitrate in 2 liters of water. This solution and sufficient ammonium carbonate solution to raise and maintain the pH at about 7.5 are added simultaneously at approximately uniform rates and with vigorous stirring to a dispersion containing 40% by weight thermal carbon black. The solids are washed and the filter cake which comprises carbon black having nickel hydroxide and copper hydroxide deposited thereon is then dried in an oven at about 300° F. The solids are then heated at a temperature of about 1500° F. in an inert atmosphere for about 60 minutes. The resulting finely-divided powder comprises free copper metal, free nickel metal and a minor amount of carbon black.

*Example 4*

This example illustrates a manner of producing a finely-divided mixture of free nickel metal and aluminum oxide.

A solution of nickel sulfate is prepared by dissolving 300 grams of nickel sulfate in 1.5 liters of water. A solution of aluminum sulfate is prepared by dissolving 500 grams of aluminum sulfate in 2.0 liters of water. The solutions of nickel sulfate and aluminum sulfate and sufficient ammonium carbonate solution to raise and maintain the pH at about 7.5 are added at approximately uniform rates and with vigorous stirring to an aqueous dispersion containing 25% by weight furnace carbon black. The solids are then washed and the filter cake which comprises carbon black having nickel hydroxide and aluminum hydroxide deposited thereon is then dried in an oven at about 300° F. The solids are then heated at a temperature of about 1800° F. in an inert atmosphere for about 30 minutes. The resulting powder of sub-micron dimensions comprises an intimate mixture of free nickel metal, aluminum oxide and a minor amount of carbon.

Mixtures of metals and refractory metal oxides similar to that set forth above are known to the art as dispersion strengthened alloys. Details pertaining to said alloys can be found in U.S. Patents 3,019,103 and 3,087,234 which disclose manners of fabricating said mixtures into metal articles.

It will be obvious from the preceding examples that the process of our invention is highly versatile and can be applied to the production of diverse metallurgical powders. Thus, many modifications in many of the incidental features utilized in illustrating our invention can be made without departing from the spirit and scope thereof.

Having described our invention what we claim is:
1. A process for producing finely-divided metallurgical products comprising the steps of:

(1) mixing into a liquid medium
   (a) a soluble compound of a metal,
   (b) carbon black, and
   (c) a substance which precipitates a compound of said metal which can be converted by reaction with carbon,
(2) recovering the solids from said medium, and
(3) heating said solids in an atmosphere selected from the group consisting of reducing atmospheres and inert atmospheres to convert said metal compound of Step 1 part (c) to a metallurgical product.

2. The process of claim 1 wherein said metal compound is chosen from the group consisting of compounds of boron, silicon, copper, barium, aluminum, titanium, zirconium, tungsten, zinc, lead, tin, iron cobalt, nickel, manganese, chromium, vanadium, thorium, molybdenum and mixtures thereof.

3. The process of claim 1 wherein said metal compound of Step 1 part (a) is a compound of iron.

4. The process of claim 1 wherein said metal compound of Step 1 part (a) is a compound of nickel.

5. The process of claim 1 wherein said metal compound of Step 1 part (a) is a compound of tungsten.

6. The process of claim 1 wherein said metal compound of Step 1 part (a) is a compound of titanium.

7. The process of claim 1 wherein said metal compound of Step 1 part (a) is a compound of aluminum.

8. The process of claim 1 wherein said metal compound of Step 1 part (a) is a compound of copper.

9. The process of claim 1 wherein Step (3) is accomplished in an inert atmosphere.

10. The process of claim 1 wherein Step (3) is accomplished in a reducing atmosphere.

11. The process of claim 1 wherein the quantity of carbon black utilized is such that the resulting metallurgical product comprises less than about 10% by weight carbon black.

12. The process of claim 1 wherein Step (3) is accomplished at temperatures between about 400° F. and about 3000° F.

13. The process of claim 1 wherein said substance of Step 1 part (c) is a base.

14. The process of claim 1 wherein said metal compound of Step 1 part (a) is a metal salt.

15. The process of claim 1 wherein a mixture of metal pounds is utilized in Step 1 part (a).

16. The process of claim 1 wherein a free metal is produced.

17. The process of claim 1 wherein a metal carbide is produced.

18. The process of claim 1 wherein a metal oxide/free metal mixture is produced.

19. The process of claim 1 wherein a free metal/metal carbide mixture is produced.

References Cited

UNITED STATES PATENTS

| | | | |
|---|---|---|---|
| 1,581,898 | 4/1926 | Wetherbee | 75—33 |
| 2,242,759 | 5/1941 | Schlect et al. | 75—89 |

DAVID L. RECK, *Primary Examiner.*

W. STALLARD, *Assistant Examiner.*